United States Patent [19]

Fujisawa

[11] Patent Number: 5,086,346
[45] Date of Patent: Feb. 4, 1992

[54] IMAGE PROCESSING APPARATUS HAVING AREA DESIGNATION FUNCTION

[75] Inventor: Tetsuo Fujisawa, Urawa, Japan

[73] Assignee: Ricoh Company, Ltd., Tokyo, Japan

[21] Appl. No.: 475,378

[22] Filed: Feb. 5, 1990

[30] Foreign Application Priority Data

Feb. 8, 1989 [JP] Japan .................... 1-29392
Feb. 27, 1989 [JP] Japan .................... 1-45950

[51] Int. Cl.⁵ .................................. G06K 9/20
[52] U.S. Cl. ............................... 358/453; 358/448; 382/44; 382/47
[58] Field of Search ............ 382/44, 47, 48, 49, 382/41, 61, 27, 42; 358/448, 453, 450, 451, 428, 431

[56] References Cited

U.S. PATENT DOCUMENTS

| | | | |
|---|---|---|---|
| 4,282,550 | 8/1981 | Coviello | 358/453 |
| 4,558,374 | 12/1985 | Kurata et al. | 358/453 |
| 4,570,187 | 2/1986 | Ono et al. | 358/453 |
| 4,760,463 | 7/1988 | Nonoyama et al. | 358/453 |
| 4,875,767 | 7/1989 | Mori et al. | 382/49 |
| 4,920,571 | 4/1990 | Abe et al. | 382/47 |
| 4,963,996 | 10/1990 | Bannai | 358/453 |

Primary Examiner—Michael Razavi
Attorney, Agent, or Firm—Oblon, Spivak, McClelland, Maier & Neustadt

[57] ABSTRACT

An image processing apparatus includes, a coordinate data generation circuit generating coordinate data designating an area on an original, an area memory storing area information relating to the inside or outside of the area, an information write circuit writing to the area memory, area information relating one of the inside and the outside of each area corresponding to an area block determined on the basis of coordinate data, a scanner optically scanning an origioeal and outputting image data in pixel, an information read circuit reading from the area memory, area information corresponding to an area block to which relates performing predetermined pixessing for the image data in pixel, said processing corresponding to area information.

12 Claims, 14 Drawing Sheets

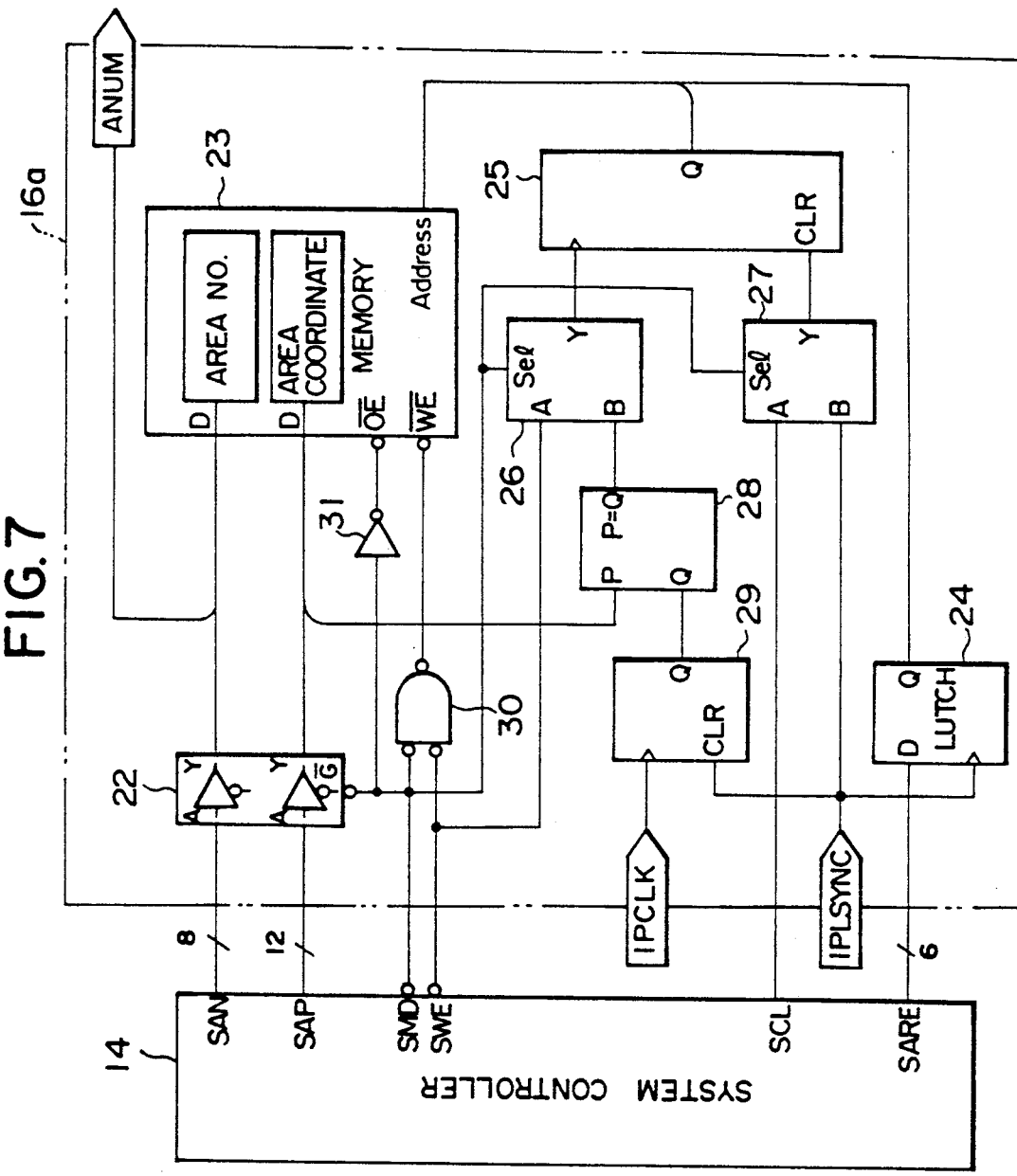

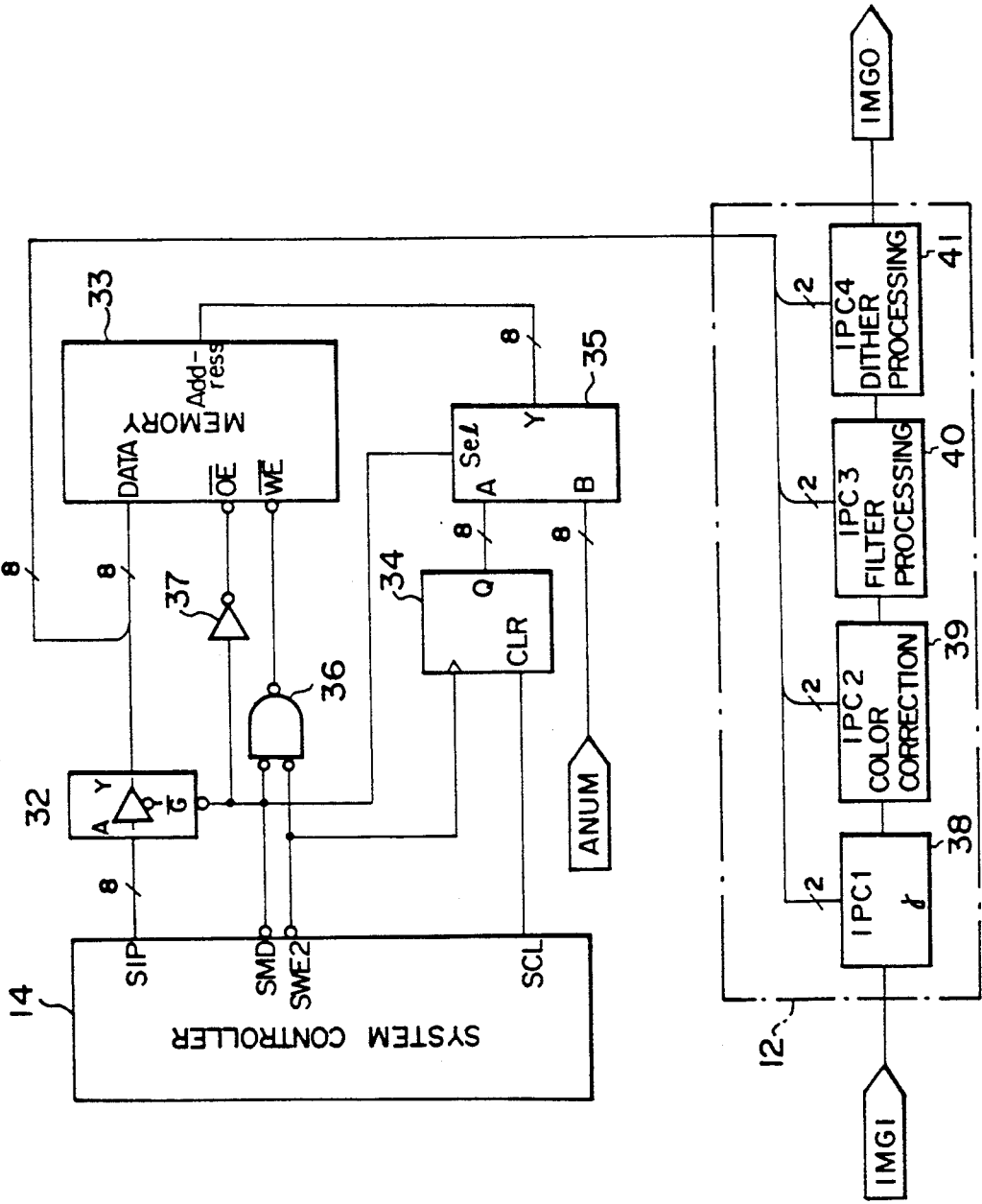

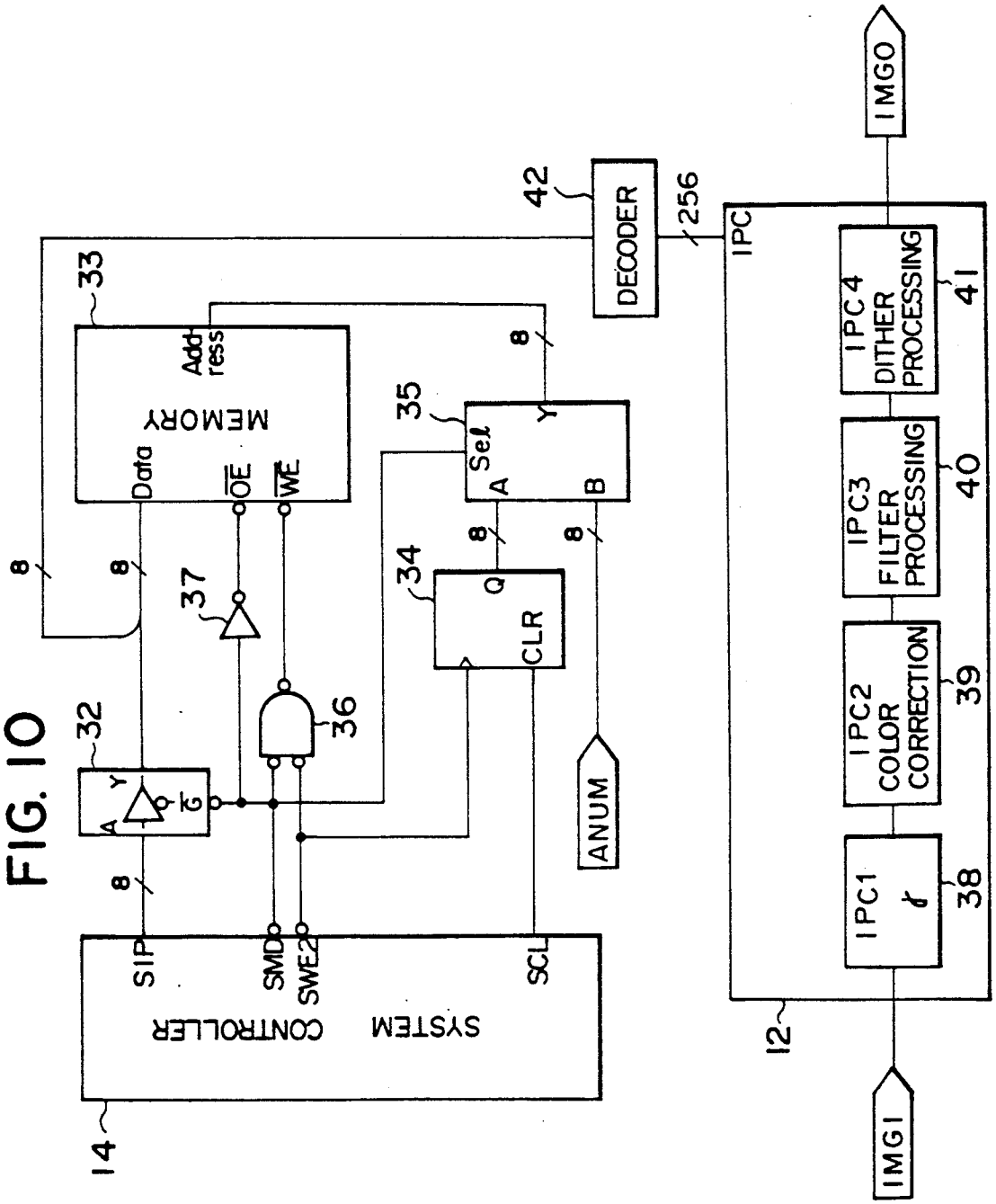

IMAGE PROCESSING APPARATUS HAVING AREA DESIGNATION FUNCTION

BACKGROUND OF THE INVENTION

The preset invention relates to an image processing apparatus having an area designation function therein. Such an apparatus for example could be a digital copy machine which can perform different types of image processing for multiple areas specified in an original image.

In general, in digital copy machines, optically read original image data is image processed by electrical signals. Accordingly, digital copy machine can perform editing of the images in a manner that cannot be performed by analog copy machine. For example, an edge emphasis processing with respect to originals which have characters by the edges may performed so that the sharpness of these characters is improved. Smoothing processing may performed with respect to dot originals so that the moire is suppressed, while a digital copy machine can also repeatedly outputs a part of image on an original and also create compound images from a plural number of originals.

Normal image processing is performed uniformly with respect to an entire original which is read. However, special effects and image processing with respect to originals containing both characters and photographs is performed only with respect to certain portions of an original in many cases. When processing of only specified portions of an original is performed, the image processing circuit must be able to recognize the closed area that will become the object of the processing, and the content and type of the image processing to be performed.

For this purpose, Japanese Patent Laid-Open No. 45765-1984 is directed to a device which is an image processing apparatus having an area designation function. In such an image processing apparatus, area identification codes corresponding to the content of image processing are stored in a zone memory for each image element. The area identification codes are either "0" or "1". A first image processing is performed with respect to image data of areas identified as "0" and a second image processing is performed with respect to image data of areas identified as "1". In order to reduce the capacity of the zone memory, small areas of 1 mm×1 mm are treated as one image element. The "0" or "1" area identification codes are stored in the zone memory for each 1 mm×1 mm image element.

However, a conventional image processing apparatus having an area designation function as described above, has the following problems.

(1) It is necessary to have a large memory to store the area information. This is to say that a large memory is required in order to store the area information for each basic unit comprising a area several pixels by several pixels in area (1 mm×1 mm). In addition, it is necessary to have a memory with a capacity proportional to size of the originals which are to be read.

(2) There is a poor accuracy of determining the position of the borders of the areas. This is because the basic unit of several pixels by several pixels (1 mm×1 mm) is used to determined the positions of the borders. This is to say that it has not been possible to designate areas using one pixel.

(3) In the case of a plural number of areas, it is not possible to designate different image processing for each area. This is because the area information uses only two values (i.e., a single bit) to identify pieces of information. This is to say that image data of each area for which "0" or "1" is stored has the first or secondary image processing performed. It is not possible to perform a third or more image processing.

If the information for each area has the number increased to two bits, for example, the it would be possible to designate area for which a third image processing is to be performed. However, the information that would have to be stored in the memory would become 2-bits for each area and the information for each of the basic elements would double and this would require double the memory capacity. In general, the designation of different image processing for each area requires a large capacity memory.

SUMMARY OF THE INVENTION

Accordingly, it is a general object of the present invention to provide a novel and useful image processing apparatus having area designations function, in which the problems described heretofore are eliminated.

A more specific object of the present invention is to provide an image processing apparatus having area designation function for which the designation of area having different image processing, is possible without requiring a large memory.

The object of the present invention can be achieved by an image processing apparatus having area designation function comprising coordinate data generation means for generating coordinate data designating an area on an original, an area memory storing area information relating to the inside or outside of the area, information write means for writing to the area memory, area information relating one of the inside and the outside of each area corresponding to an area block determined on the basis of coordinate data generated by the coordinate data generation means, original scan means for optically scanning an original and for outputting image data in predetermined image element units, information read means for reading from the area memory, area information corresponding to an area block to which relates an image element unit that is the object of scan by the original scan means, and processing means for performing predetermined processing for image data in image element unit and that is output from an original scan means, such processing corresponding to area information read from the area memory by the information read means.

Other objects and further features of the present invention will be apparent from the following detailed description when read in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a circuit diagram indicating an embodiment of the area designation apparatus according to the present invention;

FIG. 9 and FIG. 10 are diagrams indicating the configuration of a circuit storing the contents of image processing for each designated area;

DESCRIPTION OF THE PREFERRED EMBODIMENT

Figure 1:
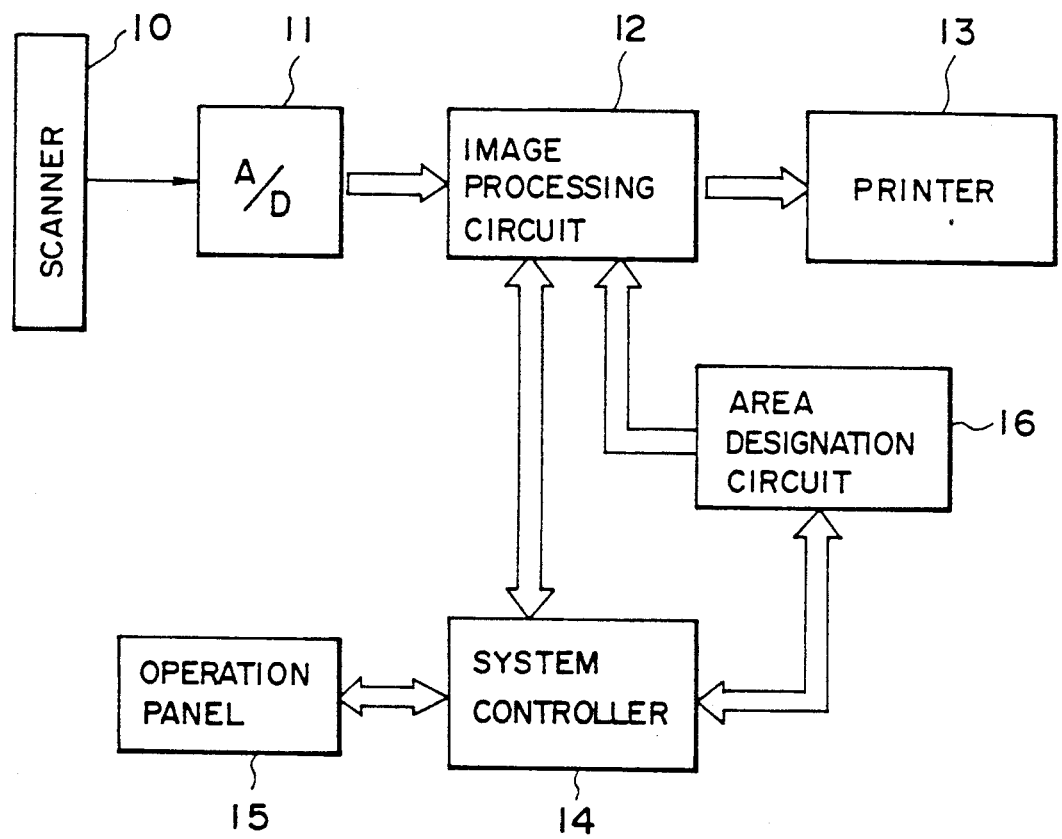
FIG. 1 is a block diagram of a configuration of a digital copy machine.

The following will be a description of a basic configuration of a digital copy machine with respect to the present invention with reference to FIG. 1.

A scanner 10 optically scans an original and successively outputs image signal corresponding to an image on an original. The image signal output from the scanner 10 is converted into digital image data of a predetermined number of bits by an A/D converter 11. An image processing circuit 12 can performs compensation, processing editing or other types of processing, with respect to the image data supplied. A printer 13 is for example a laser beam printer which prints out the image data processed by the image processing circuit 12, onto a recording sheet.

Operation signals from an operation panel 15 are provided as inputs to a system controller 14. The system controller 14 directs the integrated control of the image processing circuit 12, an area designation circuit 16 and via the image processing circuit 12, a printer 13 on the basis of the operation signals from the operation panel 15. When an operator uses either the operation panel 15 or a digitizer (not shown in the figure) to designate an area on an original, the system controller 14 to which this area information is inputted, supplies this information to the area designation circuit 16. The area designation circuit 16 stores one page of the area information received from the system controller 14, in a memory. Then, while the scanner 10 scans the original, the area designation circuit 16 reads the area information with respect to the pixels that are to have additional processing, from the memory and supplies it to the image processing circuit 12. The image processing circuit 12 then performs processing corresponding to area information, with respect to the image data of each of the pixels.

Figure 2:
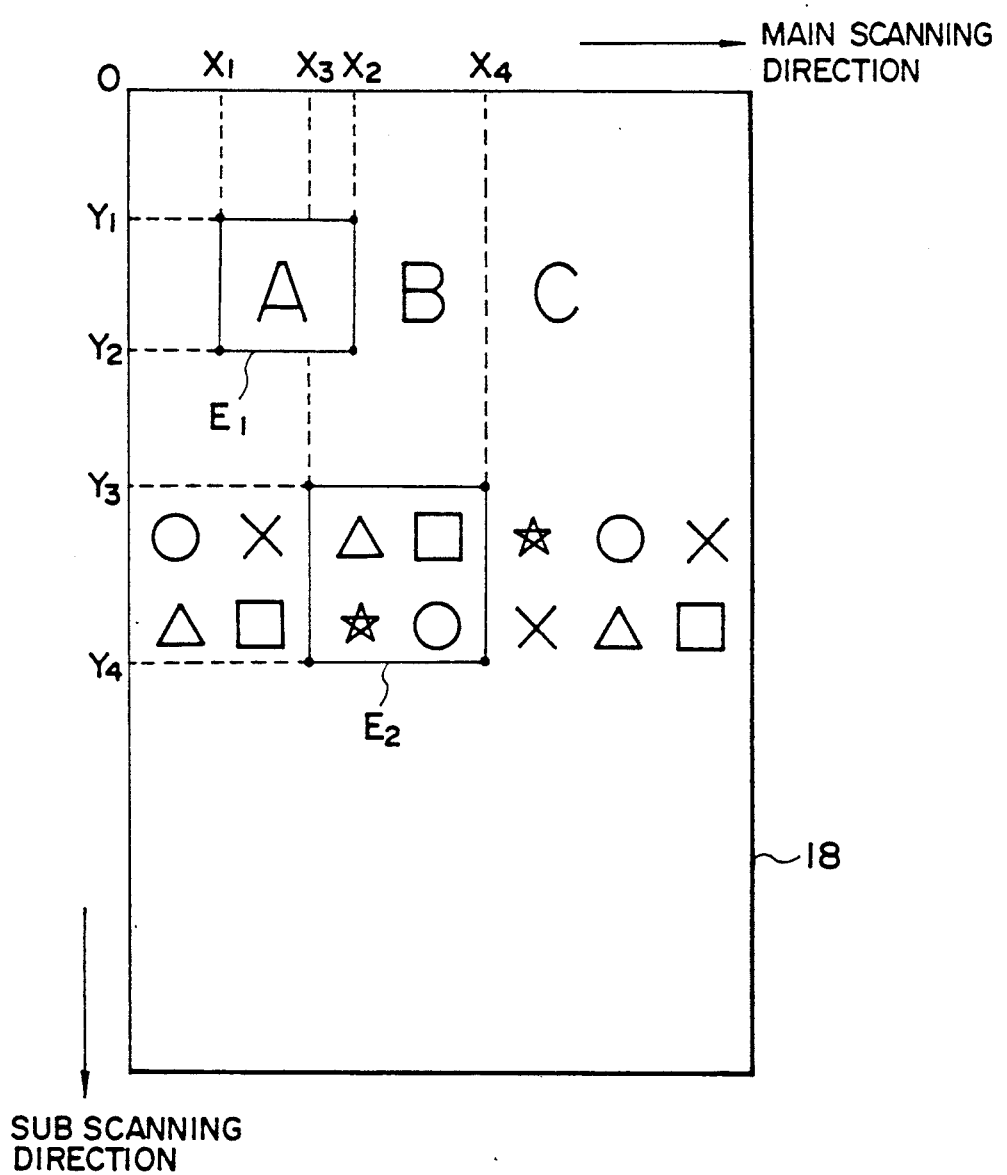
FIG. 2 is a view indicating the function to designate an area.

Designation of an area is performed by coordinate data in a predetermined coordinate system. For example, as indicated in FIG. 2, the direction of the main scan of an original 18 is set as the X-axis and the direction of the sub scan of the original 18 is set as the Y-axis. In FIG. 2, the rectangular area $E_1$ surrounding a characters is designated by the coordinate data $(X_1, Y_1)$ $(X_1, Y_2)$ $(X_2, Y_1)$ $(X_2, Y_2)$. In addition, the rectangular area $E_2$ surrounding diagrams are designated by the coordinate data $(X_3, Y_3)$ $(X_3, Y_4)$ $(X_4, Y_3)$ $(X_4, Y_4)$.

The principle for the generation of the area information is described with reference to FIG. 3 through FIG. 6.

Figure 3:
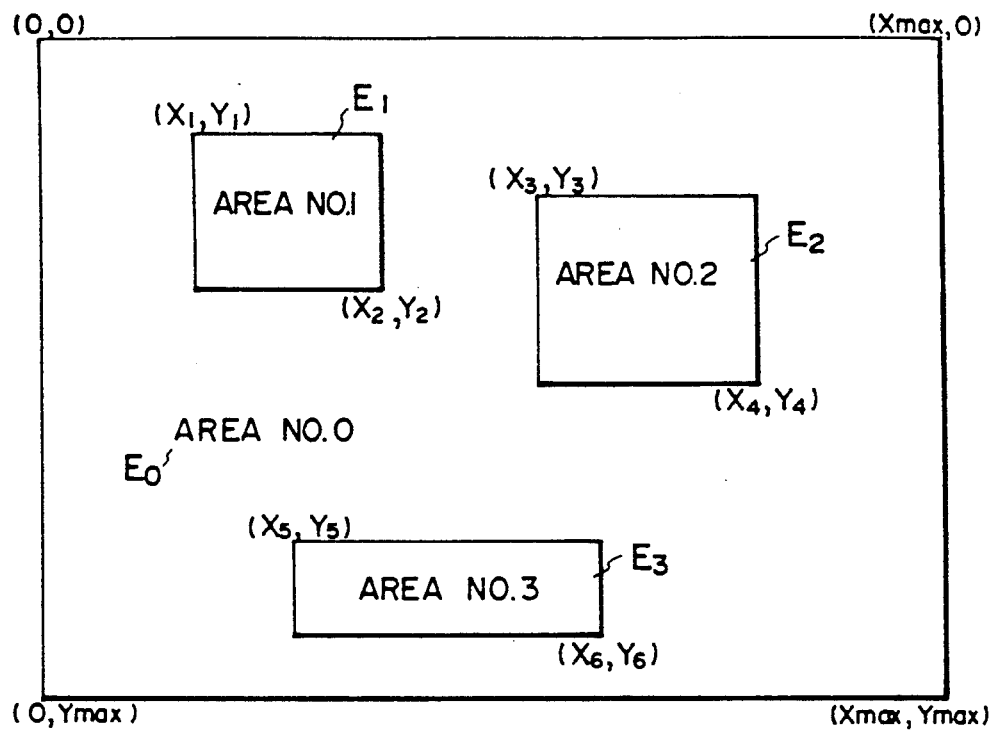
FIG. 3 is a diagram describing an example of area designation.

The image area of the original that is read is the area bounded by the four coordinate points $(0, 0)$ $(X_{max}, 0)$ $(0, Y_{max})$ $(X_{max}, Y_{max})$. The operator inputs the coordinate data for opposite corners of the rectangular area by a digitizer or the like. This coordinate data for the opposite corners sets the rectangular area. In FIG. 3, the coordinate data $(X_1, Y_1)$ $(X_2, Y_2)$ sets a first rectangular area $E_1$ which is set by the coordinate points $(X_1, Y_1)$ $(X_1, Y_2)$ $(X_2, Y_1)$ $(X_2, Y_2)$. The coordinate data $(X_3, Y_3)$ $(X_4, Y_4)$ for the opposite corners sets a second rectangular area $E_2$ which is set by the coordinate points $(X_3, Y_3)$ $(X_3, Y_4)$ $(X_4, Y_3)$ $(X_4, Y_4)$. In addition, the coordinate data $(X_5, Y_5)$ $(X_6, Y_6)$ for the opposite corners sets a third rectangular area $E_3$ which is set by the coordinate points $(X_5, Y_5)$ $(X_5, Y_6)$ $(X_6, Y_5)$ $(X_6, Y_6)$. Furthermore, in the image area of the original, an additional area $E_0$ that is not related to any of the above described first, second and third rectangular areas $E_1$, $E_2$ and $E_3$ is also set.

The following is a description for the case when it is desired that each of these four areas $E_0$, $E_1$, $E_2$ and $E_3$ has a different type of image processing to be performed therein. For example, as indicated in FIG. 3, the first area $E_1$ is given the area number 1, the second area $E_2$ is given the area number 2, the third area $E_3$ is given the area number 3 and the other area $E_0$ is given the area number 0. These area numbers correspond to the content of the image processing. This is to say that the relationship of correspondence between the area numbers and the content of the image processing is determined beforehand, and each area is given an area number corresponding to the image processing that is to be performed for that area.

Figure 4:
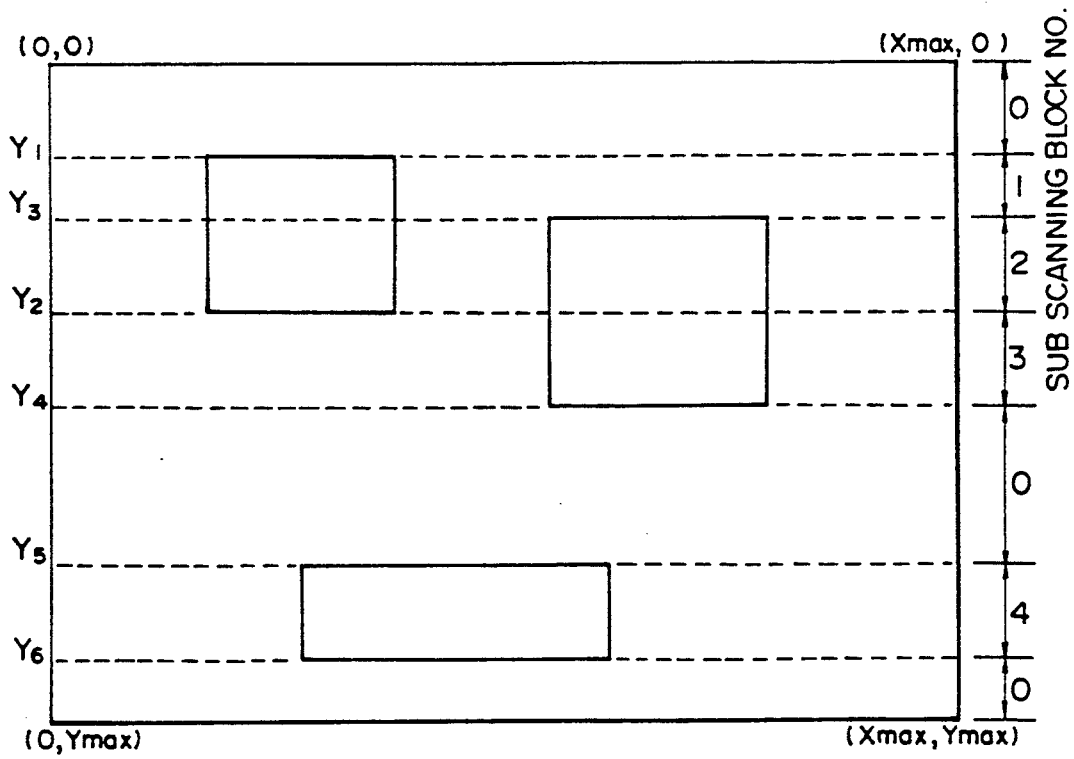
FIG. 4 is a diagram describing the blocking processing in the direction of a sub scan.

Then, as indicated in FIG. 4, the entire image area of the original is divided into a plural number of blocks in the direction of the sub scan. When the area distribution on a scan line is different from the area distribution on the previous line, the scan line is determined as a borderline of a block. For example, in the line prior to the scan line $Y_3$, there is both the area $E_0$ and the first area $E_1$ but in the scan line $Y_3$, there is the area $E_0$ and the first area $E_1$ and also the second area $E_2$. Accordingly, the scan line $Y_3$ is a borderline of a sub scan block. In the same manner, each of the scan lines $Y_1$, $Y_2$, $Y_4$, $Y_5$ and $Y_6$ are determined as borderlines of sub scan blocks. Sub scan block numbers are given to each of the sub scan blocks. If the areas distributed inside each block is the same, then that block is given the same sub scan block number. Accordingly, the block between 0 and $Y_1$ which has only the area $E_0$, the block between $Y_4$ and $Y_5$ and the block between $Y_6$ and $Y_{max}$ are given the sub scan block number "0". Then, the block between $Y_1$ and $Y_3$ is given the sub scan block number "1", the block between $Y_3$ and $Y_2$ is given the sub scan block number "2", the block between $Y_2$ and $Y_4$ is given the sub scan block number "3" and the block between $Y_5$ and $Y_6$ is given the sub scan block number "4".

Figure 5:
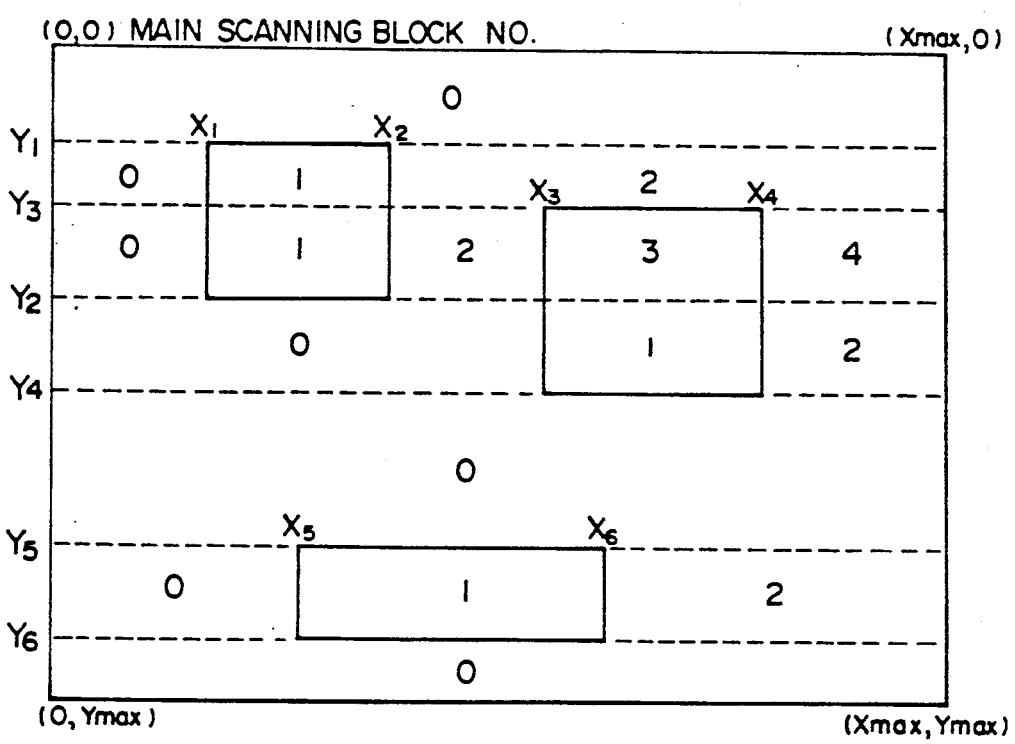
FIG. 5 is a diagram describing the blocking processing in the direction of a main scan.

As indicated in FIG. 5, the entire image area of the original is also divided into a plural number of blocks in the direction of the main scan. In the main scan line, when the area relating to a pixel is different from the area related to the former pixel in the direction of the main scan, this pixel is determined as border point of a block. There are no border points in the direction of the main scan, for between 0 and $Y_1$, $Y_4$ and $Y_5$ and $Y_6$ and $Y_{max}$ in the direction of the sub scan. The main scan block number "0" is given to the blocks between these. Between $Y_1$ and $Y_3$ in the direction of the sub scan pixels at the positions $X_1$, $X_2$ are border points. Accordingly, between $Y_1$ and $Y_3$, "0" is given to the block between 0 and $X_1$, "1" is given to the block between $X_1$ and $X_2$ and "2" is given to the block between $X_2$ and $X_{max}$ as the respective main scan numbers. Between $Y_2$ and $Y_3$ in the direction of the sub scan, pixels at the positions of $X_1$, $X_2$, $X_3$ and $X_4$ are borderline points. Accordingly, between $Y_2$ and $Y_3$, "0" is given to the block between 0 and $X_1$, "1" is given to the block between $X_1$ and $X_2$, "2" is given to the block between $X_2$ and $X_{max}$, "3" is given to the block between $X_3$ and $X_4$ and "4" is given to the block between $X_4$ and $X_{max}$ as the respective main scan numbers. Between $Y_2$ and $Y_4$ in the direction of the sub scan, the pixels at the positions $X_3$ and $X_4$ become border points. Accordingly, between $Y_2$ and $Y_4$, "0" is given to the block between 0 and $X_3$, "1" is given to the block between $X_3$ and $X_4$, and "2" is given to the block between $X_4$ and $X_{max}$ as the respective main scan block numbers. In addition, between $Y_5$ and $Y_6$ in the direction of the sub scan, the pixels at positions $X_5$ and $X_6$ form border points. Accordingly, between $Y_5$ and $Y_6$, "0" is given to the block between 0 $X_5$, "1" is given to the block between $X_5$ and $X_6$, and "2" is given to the block between $X_6$ and $X_{max}$ as the respective main scan block numbers. Blocking of the areas in the direction of the main scan and blocking of the areas in the direction of the sub scan is performed independently.

Figure 6:
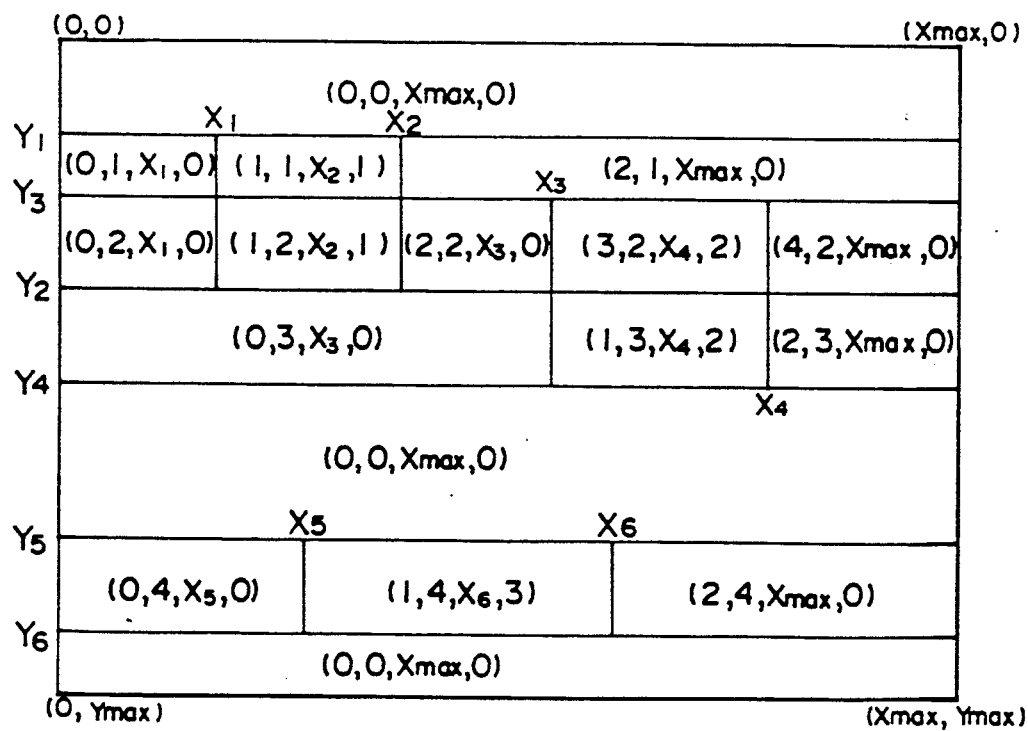
FIG. 6 is a diagram describing an example of area information.

As has been described above, the image areas of the original is divided into a plural number of blocks for both the direction of the sub scan and the direction of the main scan and these block areas obtained are given area information ($I_1$, $I_2$, $I_3$ and $I_4$) as indicated in FIG. 6. $I_1$ is the main scan block number, $I_2$ is the sub scan block number, $I_3$ is the block area tail end coordinate in the direction of the main scan and $I_4$ is the area number. For example, the area information (1, 2, $X_2$, 1) means that in the block area designated by the main scan block number "1" and the sub scan block number "2" until the main scan coordinate of the scan point becomes $X_2$ the image processing corresponding to the area number 1 is performed. As indicated in FIG. 3, for example when three areas have been designated for an original, the fifteen types of area information indicated in FIG. 6 are generated. The main scan block number ($I_1$) and the sub scan block number ($I_2$) in the area information are the address of a memory and the main scan coordinate data ($I_3$) and the area number ($I_4$) are stored in the memory.

The principle that has been described above is used so that the system controller 14 generates area information which is stored in a memory 16a of an area designation circuit indicated in FIG. 7.

The coordinate data ($X_1$, $Y_1$) ($X_2$, $Y_2$) designated with respect to a first rectangular area $E_1$, the coordinate data ($X_3$, $Y_3$) ($X_4$, $Y_4$) designated with respect to a second rectangular area $E_2$, and the coordinate data ($X_5$, $Y_5$) ($X_6$, $Y_6$) designated with respect to a third rectangular area $E_3$ are input from a digitizer to the system controller 14, and when the area numbers (corresponding to the image processing content) with respect to each of the areas $E_1$, $E_2$, $E_3$ and the other area $E_0$ are input, the system controller 14 uses the input information as the basis for performing processing in accordance with the above described principle.

The system controller 14 outputs each of the data for the area number data (SAN), the area coordinate data (SAP), the sub scan block number data (SARE) to a memory 16b along with the memory write signal (SWE), the memory address clear signal (SCL) and the mode signal (SMD). The area number data (SAN) is information that corresponds to the image processing content, and is 8-bit data input from the operation panel 15. The area coordinate data (SAP) is the tail end coordinate point information for the direction of the main scan for each block area, and is 12-bit data input from the digitizer. The sub scan block number data (SARE) is information given to each block divided in the direction of the sub scan, and is 6-bit data generated by the system controller 14. The memory write signal (SWE) is effective for the low level. The memory address clear signal (SCL) is effective for the high level. The mode signal (SMD) is the area set mode for the low level, and indicates copy operation for the high level. The memory write signal (SWE) and the memory address clear signal (SCL) are output from the system controller 14 at a predetermined timing. The memory 16a of the area designation circuit is supplied with pixel clock signal (IPCLK) and line synchronization signal (IPLSYNC) from a clock generator (not indicated in the figure). One pulse of the pixel clock signal (IPCLK) corresponds to one pixel and one pulse of the line synchronization clock signal (IPLSYNC) corresponds to one scan line (primary scan).

Figure 8A:
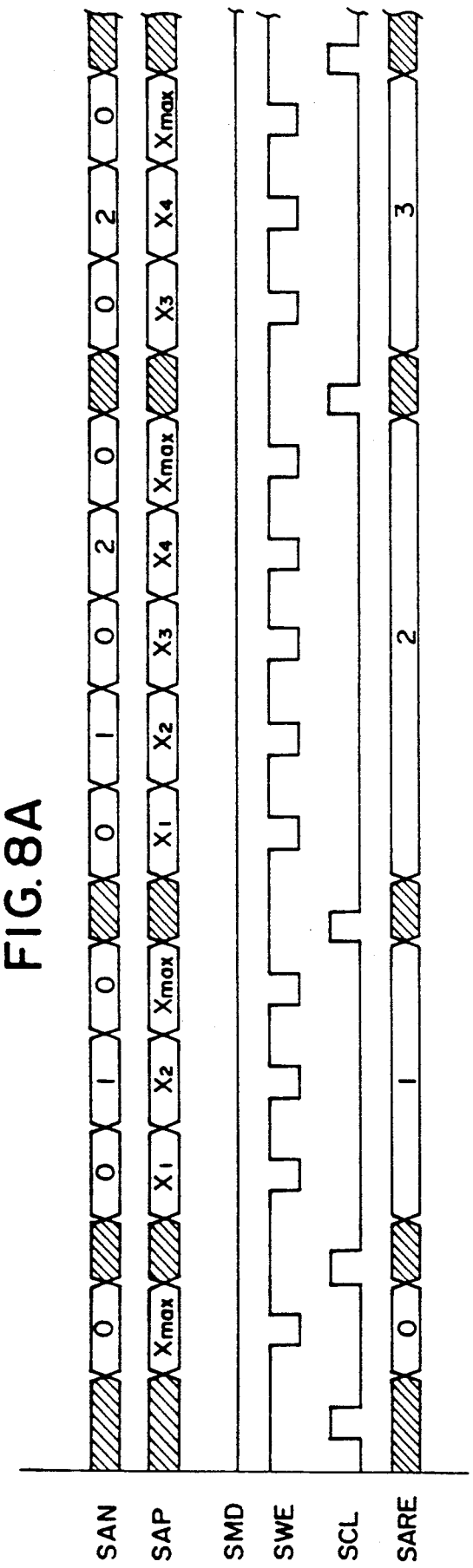
FIG. 8 is a timing chart indicating the write processing for the area information to the memory.
Figure 8B:
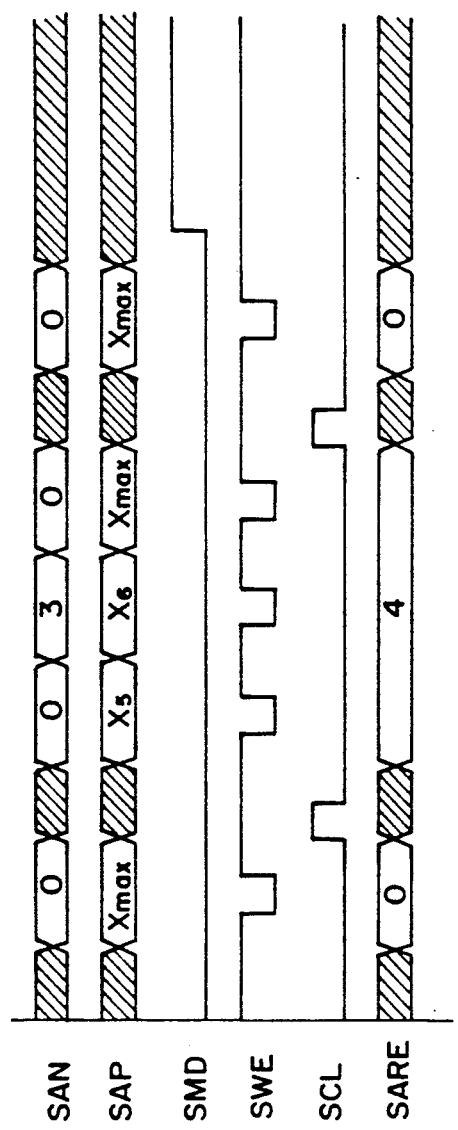

When the coordinate data designating an area input from a digitizer or the like as has been described above, and the area number (Refer to FIG. 3) is input, the system controller 14 holds the mode signal (SMD) to the low level (area set mode). When the mode signal (SMD) is held at the low level, the tri-state gate 22 and the AND gate 30 (expressed as negative logic) are placed in the enable status. In addition, when the mode signal (SMD) is at the low level, the data selectors 26 and 27 become the status where they can selected the input (A). In this status, the system controller 14 outputs each of the various types of data and signals in accordance with the timing charts indicated in FIG. 8A and FIG. 8B. In FIG. 8A and FIG. 8B, the data indicated by hatching is data that has no particular meaning.

The system controller 14 uses the input coordinate data ($Y_1$, $Y_2$, $Y_3$, $Y_4$, $Y_5$, $Y_6$) and the area numbers as the basis for the output of the determined sub scan block number data (SARE) (Refer to FIG. 4) at a predetermined timing. This sub scan block number data (SARE) is output in the order of "0"→"1"→"2"→"3"→"0"→"4"→"0". The system controller 14 then outputs the area number data (SAN) and the area coordinate data (SAP) corresponding to each of the sub scan block number data (SARE). When the first sub scan number data "0" is output, the area number data (SAN) "0" and the area coordinate data (SAP) "$X_{max}$" are output. These area number data (SAN) "0" and the area coordinate data (SAP) "$X_{max}$" are supplied via the tri-state gate 22 to the data terminal of the memory 23. In addition, the sub scan number data "0" is supplied via the latch 24 to the address terminal of the memory 23 and the count value "0" (the initial value) of the counter 25 are also supplied to the address terminal. Then, when the memory write signal (SWE) becomes effective, the data ($X_{max}$, 0) is written in address (0, 0) of the memory 23. This is to say that the relationship between the address and the memory is as follows.

| Address | Data |
|---|---|
| (0, 0) | ($X_{max}$, 0) |

Then, the memory address clear signal (SCL) that has become effective is supplied via the data selector 27 to the counter 25. The counter 25 is preset to the initial value of "0". Then, when the new sub scan block number data "1" is output, the area number data (SAN) is successively output in the order of "0", "1", "0", and the area coordinate data "$X_1$", "$X_2$", "$X_{max}$" corresponding to each area number data (SAN) is successively output. The memory write signals (SWE) that become effective and which correspond to each of the data that is successively output, are then output. These memory write signals are supplied via the data selector 26 to the counter 25. These memory write signals (SWE) count up the counter 25 through "0" "1" "2". Accordingly, each time the memory write signal (SWE) becomes effective, the data ($X_1$, 0) is written to address (0, 1) in the memory 23, the data ($X_2$, 1) is written to address (1,1) in the memory 23 and the data ($X_{max}$, 0) is written to address (2, 1) in the memory 23.

This is to say that the relationship between the addresses and the data becomes as follows.

| Address | Data |
|---|---|
| (0, 1) | ($X_1$, 0) |
| (1, 1) | ($X_2$, 1) |
| (2, 1) | ($X_{max}$, 0) |

In the same manner as has been described above, the area coordinate data (SAP) and the area number data (SAN) from the system controller 14 are output as indicated in FIG. 8A and FIG. 8B, and the area coordinate data (SAP) and the area number data (SAN) are written to the memory 23. When the sub scan block number data "2" is output, the relationship between the addresses and the data written to the memory 23 is as follows.

| Address | Data |
|---|---|
| (0, 2) | ($X_1$, 0) |
| (1, 2) | ($X_2$, 1) |
| (2, 2) | ($X_3$, 0) |
| (3, 2) | ($X_4$, 2) |
| (4, 2) | ($X_{max}$, 0) |

When the sub scan block number data "3" is output, the relationship between the addresses and the data written to the memory 23 is as follows.

| Address | Data |
|---|---|
| (0, 3) | ($X_3$, 0) |
| (1, 3) | ($X_4$, 2) |
| (2, 3) | ($X_{max}$, 0) |

Also, when the sub scan block number data "4" is output, the relationship between the addresses and the data written to the memory 23 is as follows.

| Address | Data |
|---|---|
| (0, 4) | ($X_5$, 0) |
| (1, 4) | ($X_6$, 3) |
| (2, 4) | ($X_{max}$, 0) |

In the processing described above, the count value of the counter 25 corresponds to the main scan block number indicated in FIG. 5. Accordingly, the pairs of the address and the data written to the memory 23 configures the area information ($I_1$, $I_2$, $I_3$ and $I_4$) indicated in FIG. 6.

As has been described above, when the operator performs start operation by the operation panel 15, in the status where the area number data (SAN) and the area coordinate data (SAP) are written to the memory 23, the system controller 14 raises the mode set signal (SMD) to the high level (the copy operation mode). When the mode set signal (SMD) becomes the high level, the tri-state gate 22 becomes the high-impedance status and the output of the AND gate 30 is held at the high level. In addition, the high-level mode set signal (SMD) is input via the inverter 31 to the output enable terminal OE of the memory 23 and this makes the memory 23 enter the status whereby write is possible. When the mode set signal (SMD) is at the high level, the data selectors 26 and 27 enter the status whereby input (B) is selected.

When the start operation described above is performed, the image data of the original that has been read by the scanner is supplied to the image processing circuit 12 in pixels. When the image data is supplied to the image processing circuit 12 in pixels in this manner, area coordinate data (SAP) and area number data (SAN) corresponding to the content of image processing is read out from the memory 16a of the area designation circuit 16. Then, the area number data (ANUM) is supplied to the image processing circuit 12.

The data read from the memory 23 is performed in the following manner. The system controller 14 successively outputs the sub scan block number data (SARE) as indicated in FIG. 4, when scan for the original is performed. This is to say that each of the sub scan block numbers (SARE) of "0" for between from line 0 to line $Y_1$, "1" for between from line $Y_1$ to line $Y_3$, "2" for between from line $Y_3$ to line $Y_2$, "3" for between from line $Y_2$ to line $Y_4$, "0" for between from line $Y_4$ to line $Y_5$, "4" for between from line $Y_5$ to line $Y_6$ and "0" for between from line $Y_6$ to line $Y_{max}$ are output.

For between from line 0 to line $Y_1$, line $Y_4$ to line $Y_5$, and line $Y_6$ to line $Y_{max}$, the area number data (ANUM) "0" is read out from the memory in the following manner is supplied to the address terminal of the memory 23.

The initial value "0" of the counter 25 and the sub scan block number data (SARE) "0" is also supplied via the latch 24 to the address terminal. Accordingly, the area number data (ANUM) "0" and the area coordinate data (SAP) "$X_{max}$" stored in the address (0, 0) are read from the memory 23. While one line of scanning is being performed, the counter 29 that counts the pixel clock signal (IPCLK) continues to count up successively. Then, when the count value of the counter 29 reaches $X_{max}$, the output (P=Q) of the comparator 28 rises and this signal is supplied via the data selector 26 to the counter 25. The counter 25 is incremented by the signals from the comparator 28 but when one line of scanning ends, the counter 25 is cleared by the line synchronization clock signal (IPLSYNC) supplied via the data selector 27. In addition, the counter 29 is also cleared by the line synchronization clock signal (IPLSYNC). By this operation, up to the end of one scan line (up to $X_{max}$) (0, 0) is supplied to the address terminal of the memory 23. Accordingly, the area number data (ANUM) "0" from the memory 23 is always read.

Between from line $Y_1$ to $Y_3$, the area number data (ANUM) "0" "1" "0" is read in the following manner.

First, the sub scan block number data (SARE) "1" and the initial value "0" of the counter 25 are supplied to the address terminal of the memory 23. Accordingly, the area number data (ANUM) "0" and the area coordinate data (SAP) "$X_1$ stored in address (0, 1) are read from the memory 23. While one line of scanning is being performed, the counter 29 that counts the pixel clock signal (IPCLK) continues to count up successively. Then, when the count value of the counter 29 reaches $X_1$, the output (P=Q) of the comparator 28 rises and this signal increments the counter 25. Because of this, the input address to the address terminal of the memory 23 is revised to (1, 1). When the address changes in this manner, the area number data (ANUM) "1" and the area coordinate data (SAP) "$X_2$" stored in this address (1, 1) are newly read from the memory 23. The scanning of the line is continued and when the counter value of the counter 29 reaches $X_2$, the output (P=Q) of the comparator 28 rises again and the counter 25 is again incremented by this signal. Because of this, the input address to the address terminal of the memory 23 is revised to (2, 1). When the address changes in this manner, the area coordinate data (SAP) "$X_{max}$" and the area number data (ANUM) "0" stored in this address (2, 1) are newly read from the memory 23. When the scan of the the line is again continued and when the scanning of the line is completed, the line synchronization clock signal (IPLSYNC) clears the counter 25 and the counter 29. Processing is performed in a similar manner for each of the scan lines to follow. In each of the scan lines between from line $Y_1$ to line $Y_3$, the processing described above is read area number data (ANUM) "0" for up to the pixel at the position $X_1$, area number data (ANUM) "1" for up to the pixel at the position $X_2$, and area number data (ANUM) "0" for up to the pixel at the position $X_{max}$, from the memory 23.

For between from line $Y_3$ to line $Y_2$, line $Y_2$ to line $Y_4$, and line $Y_5$ to line $Y_6$, the area number data (ANUM) "0" is read in the following manner from the memory 23. That is to say, for each of the scan lines between from line $Y_3$ to line $Y_2$, area number data (ANUM) "0" is read for up to the pixel position $X_1$, area number data (ANUM) "1" is read for up to the pixel position $X_2$, area number data (ANUM) "0" is read for up to the pixel position $X_3$, area number data (ANUM) "2" is read for up to the pixel position $X_4$ and area number data (ANUM) "0" is read for up to the pixel position $X_{max}$. In each of the scan lines between from line $Y_2$ to line $Y_4$, area number data (ANUM) "0" is read for up to the pixel position $X_3$, area number data (ANUM) "2" is read for up to the pixel position $X_4$, area number data (ANUM) "0" is read for up to the pixel position $X_{max}$. In addition, in each of the scan lines between from line $Y_5$ to line $Y_6$, area number data (ANUM) "0" is read for up to the pixel position $X_5$, area number data (ANUM) "3" is read for up to the pixel position $X_6$, area number data (ANUM) "0" is read for up to the pixel position $X_{max}$.

As a result of reading the area number data (ANUM) from the memory 23, area number data "1" for the first area $E_1$, area number data "2" for the second area $E_2$, area number data "3" for the third area $E_3$, and area number data "0" for the other area $E_0$, are supplied to the image processing circuit 12 while scanning of the original is being performed. Accordingly, the image processing circuit 12 performs image processing corresponding to the area number data "1", with respect to the image data of image elements relating to the first area $E_1$; image processing corresponding to the area number data "2", with respect to the image data of image elements relating to the second area $E_2$; image processing corresponding to the area number data "3", with respect to the image data of image elements relating to the third area $E_3$; and image processing corresponding to the area number data "0", with respect to the image data of image elements relating to the other area $E_0$.

In a first embodiment according to the present invention and as has been described above, the borderlines of the designated areas are used as the basis for dividing the image area of the original into a plural number of blocks in both the direction of the main scan and the direction of the sub scan. Then, the block number in the direction of the main scan and the block number in the direction of the sub scan correspond to the area number data. The area number data corresponding to the contents of the image processing is stored in the memory. When the data is read out from the memory, the read data is changed in block units. Accordingly, only a small memory capacity is required even in cases where there is a plural number of designated areas for which different image processing is to be performed.

In the first embodiment, different areas are given the same area number so that the same image processing is performed for all of those areas.

Figure 11:
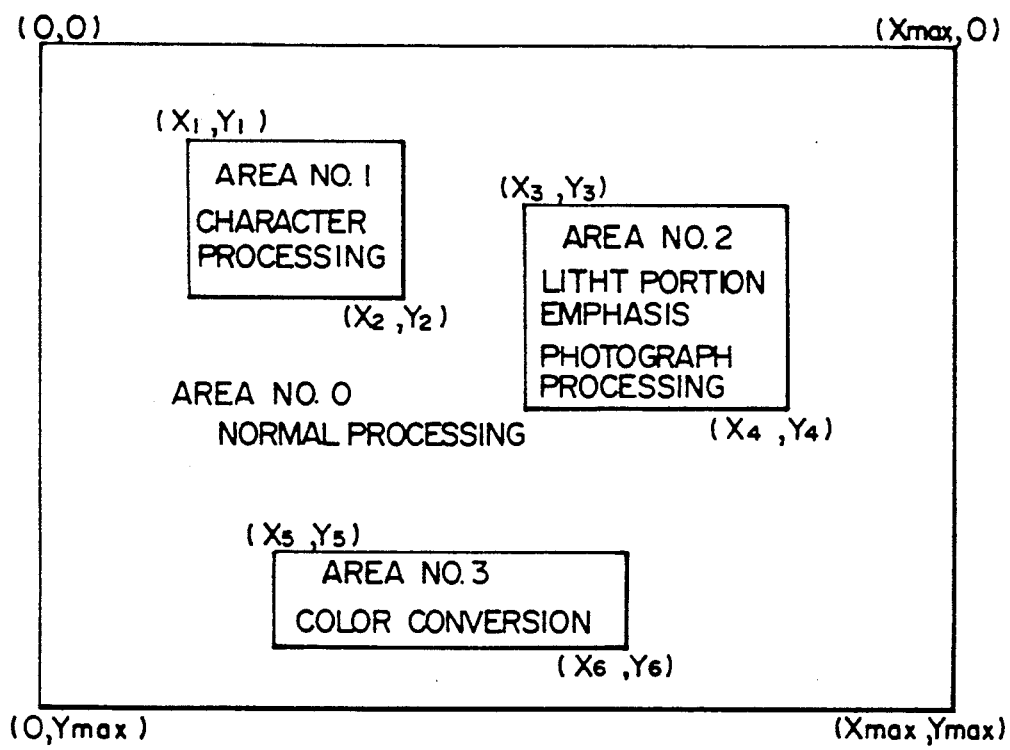
FIG. 11 is a diagram indicating the status where areas having different contents of image processing are designated.

The following is a description of a second embodiment according to the present invention, with reference to FIG. 9 through FIG. 11. In description of this embodiment, FIG. 3 through FIG. 7 that were used for the description of the previous embodiment are used without change.

In the previous embodiment, area numbers were set beforehand to correspond to the content of the image processing. The area number data and the area coordinate data are stored in the memory 23. Then, these data are read out when copy operation is performed. However, in this second embodiment, area number data is arbitrary. A processing content memory is provided to store the contents of the image processing for each these area numbers.

An area designation circuit 16 has a configuration that, in addition to a memory 16a that generates area numbers as indicated in FIG. 6, has a processing content memory that stores the contents of the image processing for inside the area, as indicated in FIG. 9. The contents of the image processing for inside the area are designated by an area number.

The area set mode and the copy operation mode in the memory 16a indicated in FIG. 7 operate in the same manner as in the first embodiment.

However, the processing contents memory indicated in FIG. 9 also has two operation modes as the memory 16a indicated in FIG. 7. This processing contents memory uses the mode set signal (SMD) of the system controller 14 to switch between the area set mode and the copy operation mode.

In the area set mode, the tri-state gate 22 is enabled and the processing contents data (SIP) is stored to the processing contents memory 33. The processing contents data (SIP) is written to the processing contents memory 33 in synchronization with the processing contents memory write signal (SWE2). The address of the processing contents memory 33 is given by a data selector 35. In this area set mode, a data selector 35 selects the signal (A). Accordingly, the output of the area number counter 34 becomes the address of the processing contents memory 33. In addition, the area number counter 34 is counted up in synchronization with the processing contents memory write signal (SWE2) and so the system controller 14 can write the processing contents data (SIP) successively to the processing contents memory 33.

In the copy operation mode, the data of the processing contents memory 33 is read and sent to the image processing circuit 12. When this occurs, the area number data (ANUM) selected by the data selector 35 is given as the address of the processing contents memory 33. Accordingly, the processing contents data corresponding to that area number is read from the processing contents memory 33.

The image processing circuit 12 has a gamma processing circuit 38, a color correction circuit 39, a filter processing circuit 40 and a Dither processing circuit 41. The image processing circuit 12 uses these circuits to perform gamma processing, color correction processing, filter processing and Dither processing, and creates the output image data IMGO. Each of the circuits 38 through 41 in the image processing circuit 12 have an input terminal IPC1 through IPC4 in order to switch and control the contents of processing. The specific contents of the above mentioned gamma processing, color correction, filter processing and Dither processing is disclosed in Japanese Patent Laid-Open No. 186666-1985.

In this second embodiment, the area number data (ANUM) is 8-bit and so it is possible to designate a maximum of 256 areas. In addition, data stored in the processing contents memory 33 is also 8-bit and so it is possible to designate one type a maximum of 256 types of image processing for each designated area. The 256 types of image processing specify combinations of four types of gamma processing, four types of color correction processing, 4 types of filter processing and 4 types of Dither processing.

As indicated in FIG. 10, the data from the processing contents memory 33 is input to a decoder 42 and the output of the decoder 42 is input to the IPC that controls the entirety of the image processing circuit 12 so that it is possible to designate an arbitrary 256 types of image processing.

FIG. 3 through FIG. 6 indicate an example of specific application for this second embodiment as well. That is to say, that the data which is blocked and provided with the area number as indicated in FIG. 6, is written to the processing contents memory 33 as data determining the image processing contents of each area. The following will consider the case where the processing indicated in FIG. 11 corresponding to each of the areas in FIG. 3 is performed.

First, the processing contents expressed by each of the 2-bit signals from the input IPC1 through IPC4 of each of the processing circuits 38 through 41 in the image processing circuit 12 is summarized in the table below.

TABLE

| IPC1-4 Processing | 00 | 01 | 10 | 11 |
|---|---|---|---|---|
| Gamma Processing | Normal | Emphasis of dark portions | Emphasis of light portions | Reversal |
| Color correction processing | Normal | Designated color conversion | Registered color conversion | Monochrome |
| Filter processing | Through | Smoothing | Edge emphasis | Edge extraction |
| Dither processing | Normal | Binarization | Dot concentration type patterns | Patterns with screen angles |

First, the processing content for a block of area number "0" which is "normal processing" is set as follows.

| Gamma processing | Normal - - - IPC1 = 00 |
|---|---|
| Color correction processing | Normal - - - IPC2 = 00 |
| Filter processing | Through - - - IPC3 = 00 |
| Dither processing | Normal - - - IPC4 = 00 |

This is to say, 00000000 is written to address 0 of the processing contents memory 33. In addition, the processing content for the block with area address "1" which is "character processing" is set as follows.

| Gamma processing | Normal - - - IPC1 = 00 |
|---|---|
| Color correction processing | Normal - - - IPC2 = 00 |
| Filter processing | Edge emphasis - - - IPC3 = 10 |
| Dither processing | Binarization - - - IPC4 = 01 |

This is to say that 00001001 is written to the address 1 of the processing contents memory 33.

Then, in the same manner, the "light emphasis, photograph processing for area address 2 is set as follows.

| Gamma processing | Light emphasis - - - IPC1 = 10 |
|---|---|
| Color correction processing | Normal - - - IPC2 = 00 |
| Filter processing | Smoothing - - - IPC3 = 01 |
| Dither processing | Screen angle - - - IPC4 = 11 |

This is to say that 10000111 is set in address 2 of the processing contents memory 33.

The "designated color conversion processing" of area number 3 is set as follows.

| Gamma processing | Normal - - - IPC1 = 00 |
|---|---|
| Color correction processing | Designated color conversion - - - IPC2 = 01 |
| Filter processing | Normal - - - IPC3 = 00 |

| -continued | |
|---|---|
| Dither processing | Normal - - - IPC4 = 00 |

This is to say that 00010000 is written to the address 3 of the processing contents memory 33.

By these settings, the image processing circuit 12 which is supplied with data from the area designation circuit according to this embodiment, performs different image processing with respect to each of the areas as indicated in FIG. 11.

The following is a description of another example of a digital copy machine (image processing apparatus) having the area designation circuit that has been described above. This digital copy machine has a function to either enlarge or reduce an image of an original.

Figure 12:
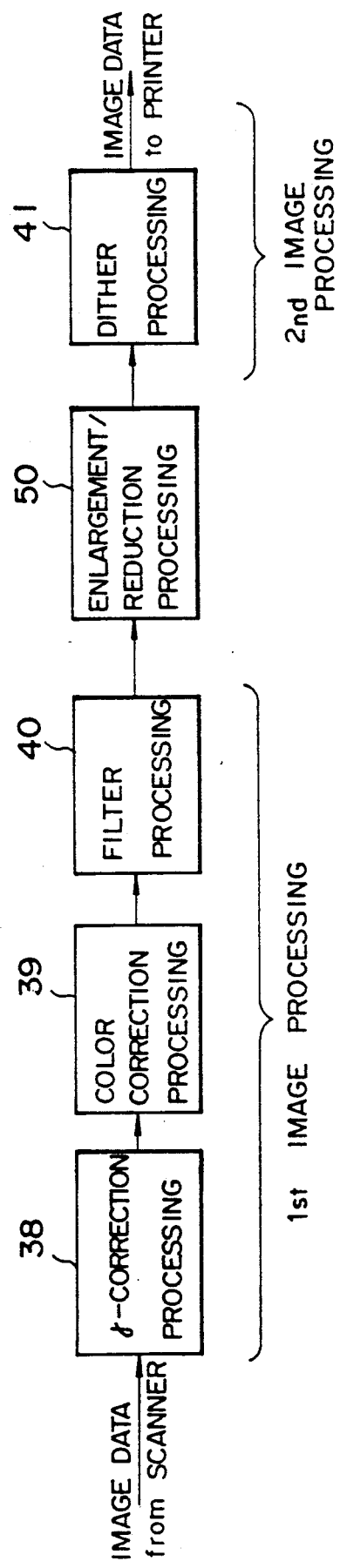
FIG. 12 is a block diagram indicating an example of a configuration of an image processing circuit.
Figure 13:
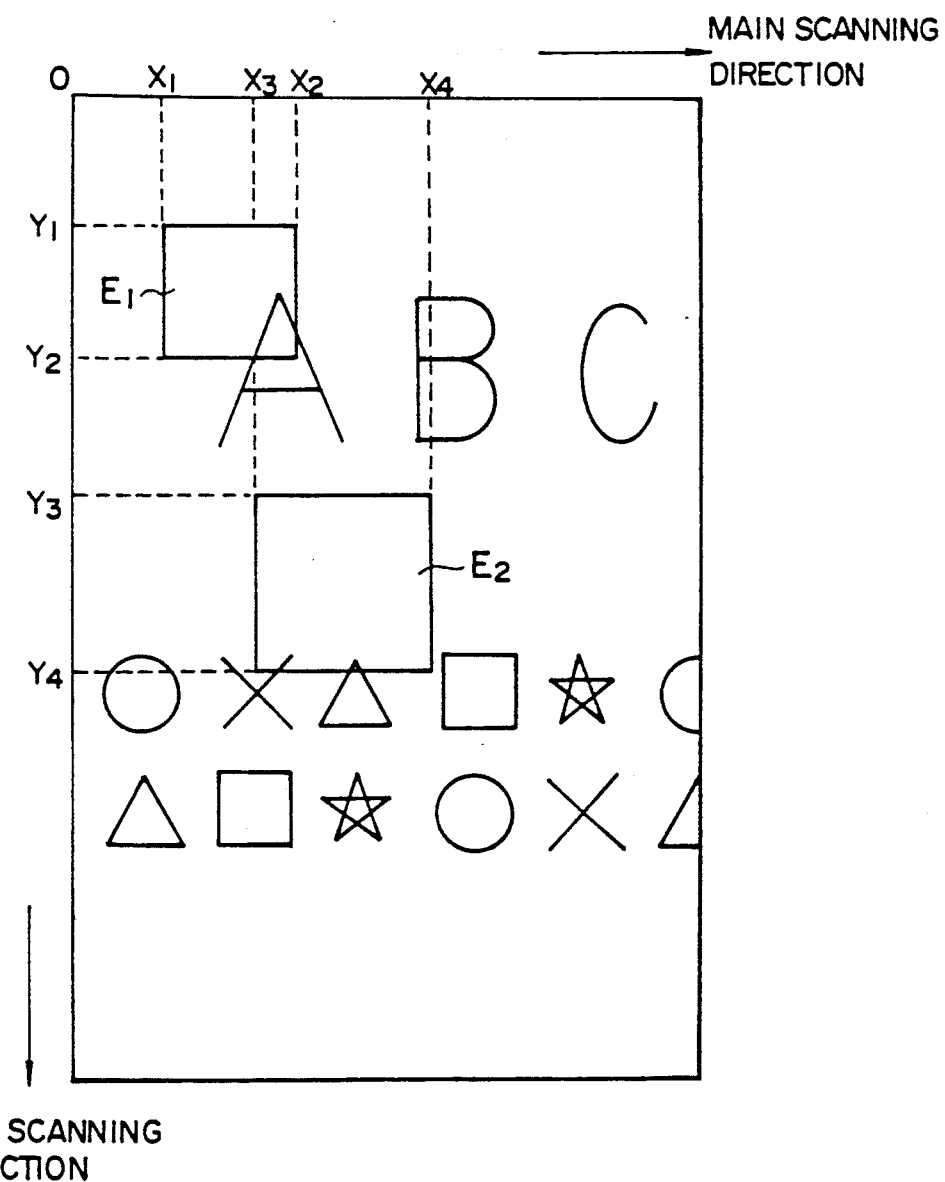
FIG. 13 is a diagram indicating a problem when enlarged processing is performed for a designated area.

So that the status of an image that is printed on a recording sheet becomes optimum, image processing circuit is designed including enlargement/reduction circuits. The configuration of such an image processing circuit is for example, as indicated in FIG. 12. A gamma processing circuit 38, a color correction processing circuit 39, a filter processing circuit 40, enlargement/reduction circuit 50 and a Dither processing circuit 41 are disposed in series, and image data from a scanner 10 passes through each of these processing circuits in order. In this configuration, prior to the enlargement and reduction processing, a first image processing (gamma processing circuit 38, a color compensation processing circuit 39, a filter processing circuit 40) is performed and then a second image processing (Dither processing circuit 41) is performed after the enlargement and reduction processing. In an image processing circuit having such a configuration, there is no problem in the enlargement/reduction of the entire image after a first image processing has been performed for the designated area. However, if a second image processing is performed for a designated area after the entire image has been enlarged/reduced, then it is not possible to obtain a normal image. For example, in the image indicated in FIG. 2, when the entire image is enlarged and a second image processing is performed for only the areas $E_1$ and $E_2$, the relationship between the pixel positions of the area signals from the area designation circuit and the pixel positions of the image data on the original change as indicated in FIG. 13. Then, in the image processing circuit, it is no longer possible to perform normal processing for the area outside and inside the area designated by the area signals.

Figure 14:
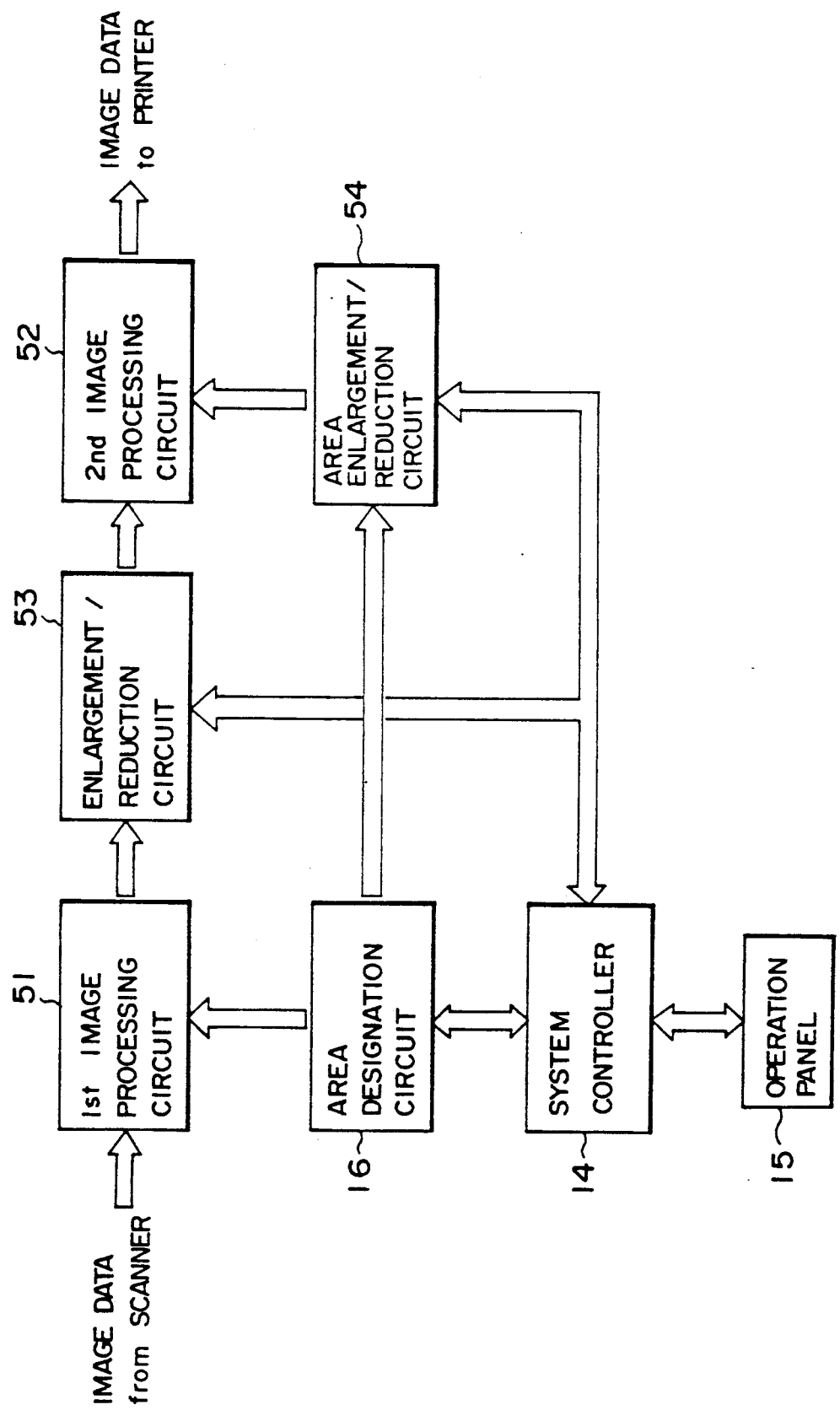
FIG. 14 is a block diagram indicating an embodiment of an image processing apparatus that performs enlargement processing for a designated area.
Figure 15:
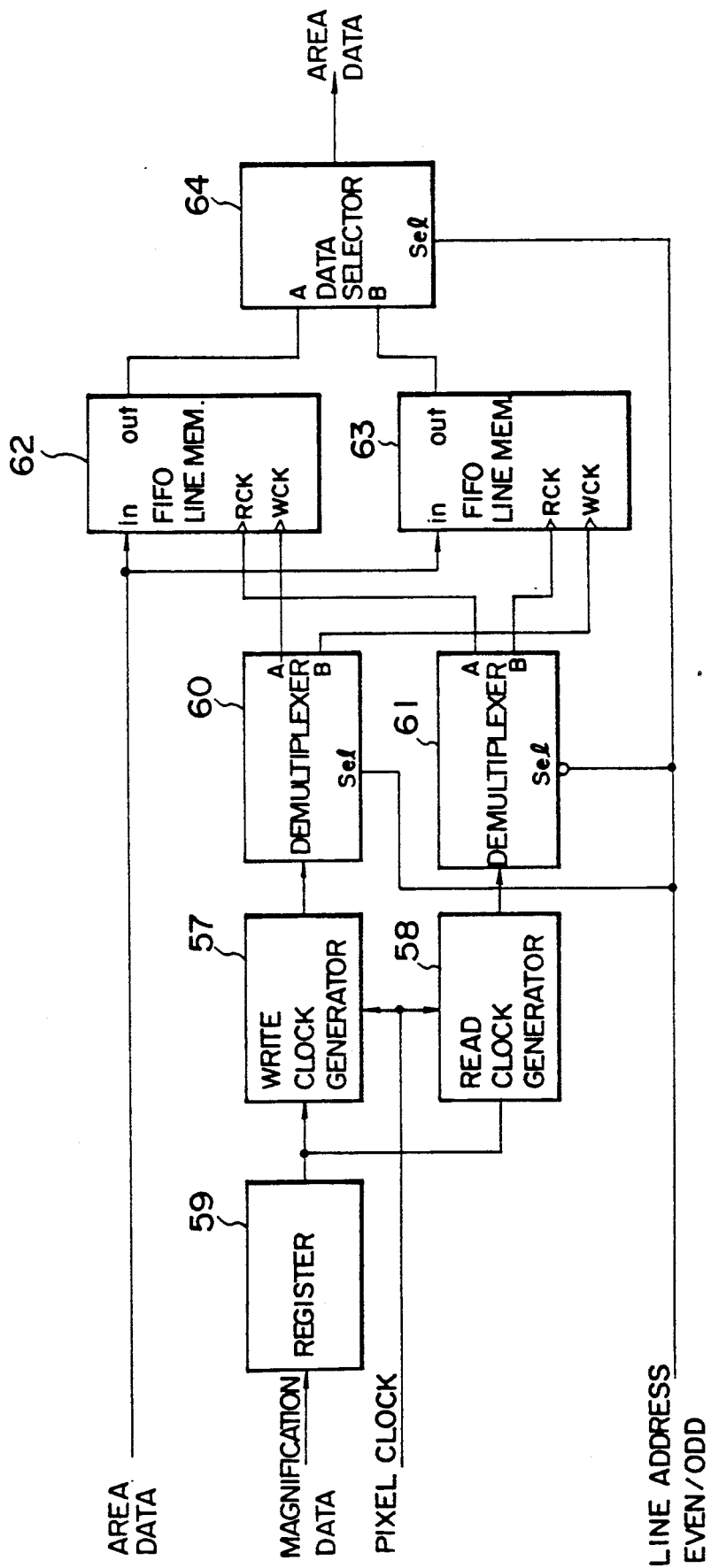
FIG. 15 is a diagram indicating a configuration of an area enlargement/reduction circuit.
Figure 16:
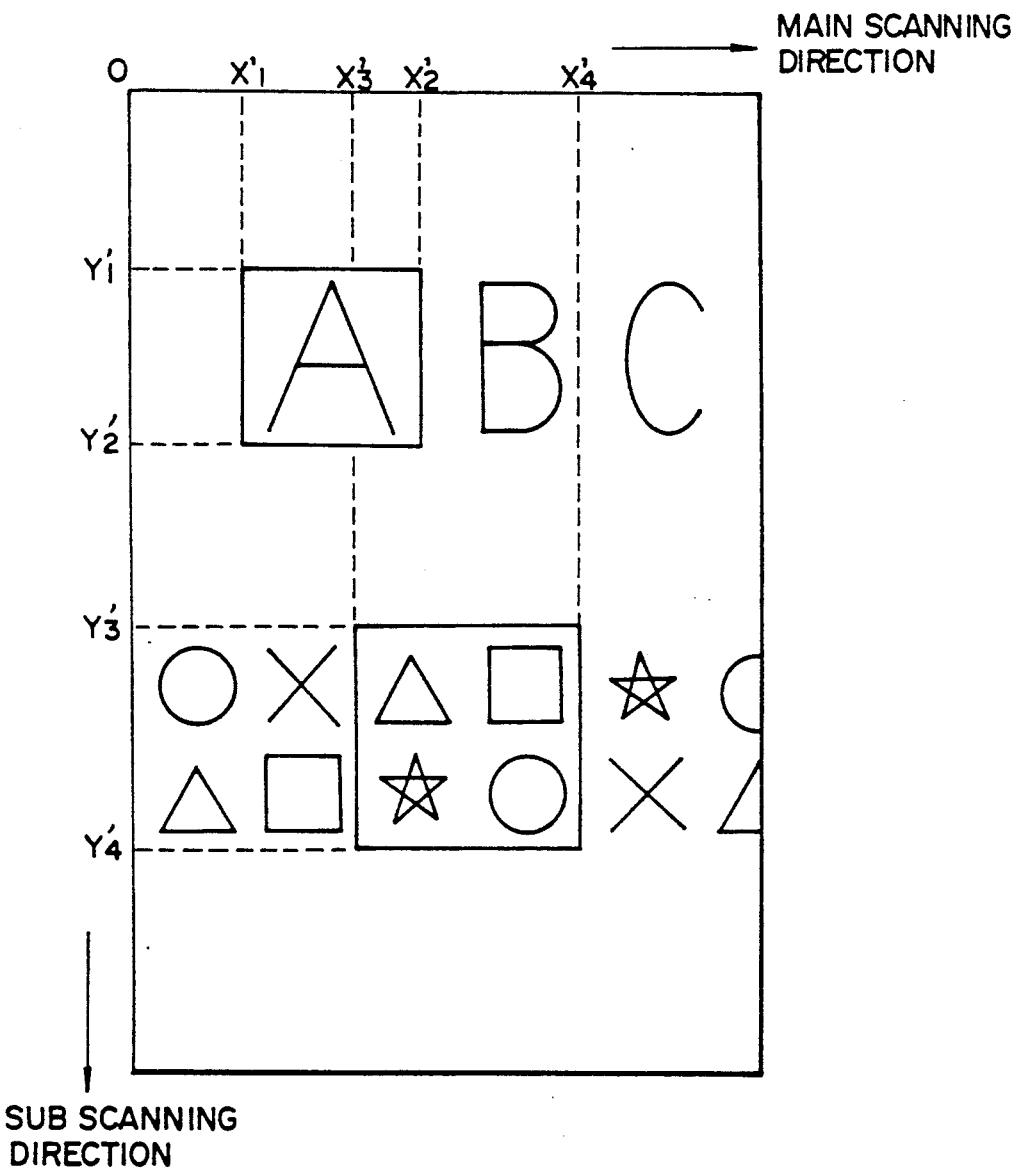
FIG. 16 is a diagram indicating the status where the apparatus of the embodiment performs enlargement processing for a designated area.

The following is a description of a digital copy machine that solves this problem, and the description is given with reference to from FIG. 14 to FIG. 16.

FIG. 14 shows the basic configuration. In FIG. 14, those portions that are the same as those in FIG. 1 are indicated using the same numerals. In addition, the scanner 10, the A/D converter 11 and the printer 13 indicated in FIG. 1 are not indicated in FIG. 14 but a scanner 10 and a A/D converter 11 are provided at a stage prior to the first image processing circuit 51 and a printer 13 is provided at a stage after the second image processing circuit 52. The first image processing circuit 51 includes a gamma processing circuit 38, a color correction circuit 39 and a filter processing circuit 40, as indicated in FIG. 12. The second image processing circuit 52 includes a Dither processing circuit 41. On the basis of the magnification data supplied from the system controller 14, the image enlargement/reduction circuit 53 enlarges or reduces the image data from the first image processing circuit 51. On the basis of the magnification data supplied from the system controller 14, the area enlargement/reduction circuit 54 enlarges or reduces the area data (area number data (SARE)) supplied from the area designation circuit 16.

The system controller 14 has two operation modes that control the entirety of this disital copy machine.

The first operation mode of the system controller 14 is the set mode. In this set mode, the area coordinate data and the area number data corresponding to the image processing contents is written to the memory 23 (Refer to FIG. 7) of the area designation circuit 16. Then, the system controller 14 writes arbitrary magnification data in the internal register of the area enlargement/reduction circuit 54 and the image enlargement/reduction circuit 53.

In the system controller 14, the second operation mode is the copy operation mode. In this copy operation mode, the system controller 14 performs the data read control in synchronization with the original image data input with respect to the memory 23 of the area designation circuit 16, in the same manner as has already been explained.

In the process of scanning the original, the area designation circuit 16 supplies the area number data (ANUM) corresponding to the image processing, to the first image processing circuit 51, in the same manner as has been already explained. In addition, the area number data (ANUM) from the area designation circuit 16 is supplied to the area enlargement/reduction circuit 54. The area enlargement/reduction circuit 54 is provided to make agreement between the pixel position of the image data that has been enlarged/reduced by the image enlargement/reduction circuit 53, and the pixel position of the image for which processing is to be performed by the second image processing circuit 52. The area enlargement/reduction circuit 54 performs enlargement/reduction processing to the magnification ratio set with respect to the area data (area number data in pixels) sent from the area designation circuit 16. The new area data obtained from this processing is supplied to the second image processing circuit 52.

The first image processing circuit 51 performs processing corresponding to the area data (area number data) with respect to the input original image data. Accordingly, the first image processing circuit 51 performs different processing for the inside and outside of the closed area set by the area data from the area designation circuit 16. In addition, the second image processing circuit 52 performs processing corresponding to the area data that has been enlarged/reduced in the same way by the area enlargement/reduction circuit 54. Accordingly, the second image processing circuit 52 performs different processing for the inside and outside of the closed area set by the area data from the area enlargement/reduction circuit 54.

The parameters when the first image processing circuit 51 and second image processing circuit 52 perform processing with respect to the image data, are switched in real time by the area data. This parameter switching changes the contents of the processing for the image data. In the first image processing circuit 51 and second image processing circuit 52, these parameters are filter coefficients in the filter circuit and Dither patterns in the Dither circuit, etc. Then, these parameters stored in the read-only memory (ROM) for example. The area data is used to change the parameters read from the ROM, by switching the higher-order addresses in the ROM.

On the basis of the magnification data in the internal register, the image enlargement/reduction circuit 53 performs enlargement/reduction of the input original image data, in the direction of the main scan of the original. The image enlargement/reduction circuit 53 has a configuration the same as that has been used in conventional image processing apparatus of digital copy machine. The enlargement/reduction of the input original image data with respect to the direction of the sub scan is performed by controlling the speed at which the system controller 14 takes in the original image read by the scanner 10.

FIG. 15 shows the configuration of the area enlargement/reduction circuit 54 described above.

The write clock generator 57 and the read clock generator 58 create the write clock and the read clock on the basis of magnification data that is written by the system controller 14 to the register 59. These write clock and read clock differ for when the original image is printed at 100% magnification and for when the original image is enlarged/reducted. When the original image is prined at 100%, the write clock generator 57 and the read clock generator 58 generate the same write clock and read clock as the pixel clock. When the original image is enlarged, the write clock generator 57 generates the write clock which is the same as the pixel clock but the read clock generator 58 generates a number M of read clocks with respect to the number N of pixel clocks. N and M are natural numbers with N>M. In addition, when the original image is reduced, the read clock generator 58 generates the read clock which is the same as the pixel clock but the write clock generator 57 generates a number M of write clocks with respect to the number N of pixel clocks. Controlling the write clock and the read clock magnifies the area data by N/M times and reduces the area data by M/N times.

The demultiplexers 60 and 61 switch the read clock (RCK) and the write clock (WCK) of the two first-in first-out (FIFO) line memories 62 and 63 depending on whether the line address is either an odd number or an even number. This is to say that the demultiplexers 60 and 61 give the write clock from the write clock generator 57 to the line memory 62 and give the read clock from the read clock generator 58 to the line memory 63 when the line address is an even number. Thus, for even numbered lines, the area data from the area designation circuit 16 is written to the line memory 62 and at the same time, the area data from the line memory 63 is output to the data selector 64. In addition, for odd numbered line addresses, the read clock from the read clock generator 58 is given to the line memory 62 and the write clock from the write clock generator 57 is given to the line memory 63. This is to say that for odd numbered lines, the area signals from the area designation circuit 16 are written to the line memory 63 and at the same time, the area data from the line memory 62 is output to the data selector 64. In this manner, the alternating usage of the line memories 62 and 63 can enlarge/reduce the area data using only clock control of the line memories 62 and 63.

The data selector 64 always selects which of the two line memories 62 and 63 the read operation is to be performed for. Accordingly, the area data that has been enlarged/reduced, is output by the data selector 64, from that line memory to the second image processing circuit 52.

In the embodiment described above, the area data from the area designation circuit 16 is supplied to the first image processing circuit 51 provided at a prior stage to the image enlargement/reduction circuit 53, and the area enlargement/reduction circuit 54 supplies the enlarged/reduced area data to the second image processing circuit 52 provided at a stage after the image enlargement/reduction circuit 53. Accordingly, the image element position and the area data image element position are always in agreement. For example, as indicated in FIG. 2 for when the areas $E_1$ and $E_2$ are specified, these areas $E_1$ and $E_2$ are areas that have been enlarged/reduced by the area enlargement/reduction circuit 54 as is indicated in FIG. 16. Accordingly, the processing in the second image processing circuit 52 provided at a later stage to the image enlargement/reduction circuit 53 is performed separately for the inside and the outside of the enlarged/reduced areas $E_1'$ and $E_2'$.

The present invention is not limited to the aforementioned embodiments, and variations and modifications may be mode without departing from the scope of the claimed invention.

What is claimed is:

1. An image processing apparatus comprising:
designating means for designating a plurality of areas on an original document and for outputting coordinate data representing a designated areas, a process being assigned to each area;
dividing means, coupled to said designating means, for dividing the original document into a plurality of blocks based on the coordinate data output from said designating means, said dividing means outputting number information for each block;
area information generating means for generating area information for each of blocks obtained by said dividing means, said area information including an area number representing the process assigned to a designated area to which each block belongs and border information representing a border of each block;
memory means for storing the area information;
information write means, coupled to said dividing means and said memory means, for writing the area information for each block at an address in said memory means, the address being specified by the number information output for each corresponding block from said dividing means;
original scan means for optically scanning the original document and for outputting image data for each pixel;
information read means, coupled to said memory means, for reading out the area information for each block from the address in said memory means while said original scan means scans the original document, the address being specified by the number information of each corresponding block which is scanned by said original scan means; and
processing means, coupled to said information read means, for carrying out the process for image data output for each pixel from said original scan means until a position at which the original scan means scans the original document reaches a position corresponding to the border information of the area information for each corresponding block, a content of the process being specified by the area number of the area information for each corresponding block, the area information being supplied from said information reading means.

2. The image processing apparatus as claimed in claim 1, wherein said dividing means has sub scan number generation means for generating a first number in the direction of the sub scan, with respect to each block, and main scan number generation means for generating a second number in the direction of a main scan, with respect to each block, said first number and said second number forming said number information.

3. The image processing apparatus as claimed in claim 2, wherein said main scan number generation means has a counter counting a write signal for writing the area information to said memory means, and a circuit for clearing said counter when said sub scan number generation means generates a new first number in the direction of the sub scan, and wherein a count value of said counter is the second number in the direction of the main scan.

4. The image processing apparatus as claimed in claim 1, wherein said information read means has read block information means for generating the number information for each block which is scanned by said original scan means, and address supply means for supplying to said memory means as the address, the number information generated by said read block information generation means.

5. The image processing apparatus as claimed in claim 4, wherein said dividing means has sub scan number generation means for generating a first number in the direction of the sub scan, with respect to each block, and main scan number generation means for generating a second number in the direction of the main scan, with respect to each block, said first number and said second number forming said number information output from said dividing means, and wherein, said read block information generation means has read sub scan number generation means for generating a first number in the direction of the sub scan, with respect to each block which is scanned by said original scan means, and read main scan number generation means for generating a second number in the direction of the main scan, with respect to each block which is scanned by said original scan means, said first number and said second number forming the number information generated by said read block generation means.

6. The image processing apparatus as claimed in claim 5, wherein said read main scan number generation means has a signal generation circuit outputting a first timing signal when said original scan means scans at a position corresponding to the border information for each block in the direction of the main scan, and a first counter for counting said first timing signal output from said signal generation circuit, and a circuit far clearing said first counter when the original scan means completely scans for one line in the direction of the main scan, and wherein a count value of said first counter is the second number in the direction of a main scan.

7. The image processing apparatus as claimed in claim 6, wherein the border information stored in said memory means includes a coordinate data representing the border of each block in the direction of the main scan, and wherein said signal generation circuit has a second counter counting a second timing signal corresponding to pixels, and a comparator for comparing the coordinate data of the border information stored for each block in said memory means with a count value of said second counter and for outputting the first timing signal when the count value becomes equal to the coordinate data.

8. The image processing apparatus as claimed in claim 1, further comprising:
   a processing memory for storing processing information,
   write means for writing processing information corresponding to the area number, and
   processing information output means for reading out the processing information corresponding to said area number, from said processing memory when said area number is read out from said memory means by said information read means,
   wherein said processing means carries out the process specified by the processing information read out from said processing memory by said processing information output means.

9. The image processing apparatus as claimed in claim 8, wherein said write means for writing processing information to said processing memory has an address counter that generates an address corresponding to the area number.

10. The image processing apparatus as claimed in claim 8, wherein said processing information output means has a circuit for supplying to said processing memory, the area number read out from said memory means by said information read means.

11. The image processing apparatus as claimed in claim 1, further comprising:
   image enlargement/reduction means for performing enlargement/reduction processing with respect to image data output from said original scan means,
   area enlargement/reduction means for performing an enlargement/reduction processing corresponding to a magnification ratio in said image enlargement/reduction means, with respect to area information output from said memory means by said information read means, and wherein, said processing means performs the process based on the area information that has been obtained by the enlargement/reduction processing in said image enlargement/reduction means.

12. The image processing apparatus as claimed in claim 11, wherein said area enlargement/reduction means has a register in which is set a magnification ratio the same as one set in said image enlargement/reduction means, a clock generator generating a write clock signal and a read clock signal having a synchronization ratio corresponding to the magnification ratio set in said register, and a line memory for which the area information in synchronization with the write clock and the read clock generated by said clock generation means, is written and read, and wherein the area information read out from said line memory is supplied to said processing means.

* * * * *